(12) United States Patent
Ohmura et al.

(10) Patent No.: US 6,573,925 B2
(45) Date of Patent: Jun. 3, 2003

(54) OPTICAL PRINTER MODULE

(75) Inventors: Hiroshi Ohmura, Asaka (JP); Ko Aosaki, Asaka (JP); Hiroyuki Uchiyama, Asaka (JP); Seiji Takada, Asaka (JP); Hiroshi Soma, Asaka (JP); Chiaki Fujii, Asaka (JP); Seimei Ushiro, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/812,903

(22) Filed: Mar. 21, 2001

(65) Prior Publication Data
US 2001/0033744 A1 Oct. 25, 2001

(30) Foreign Application Priority Data
Mar. 21, 2000 (JP) .......................................... 2000-078756

(51) Int. Cl.$^7$ ............................................... B41J 2/435
(52) U.S. Cl. ........................................ 347/262; 347/264
(58) Field of Search ................................. 347/234, 248, 347/227, 262, 264, 225; 396/36, 417, 418, 512, 516, 518, 535

(56) References Cited

U.S. PATENT DOCUMENTS

| | | | | |
|---|---|---|---|---|
| 3,922,700 A | * | 11/1975 | Agano et al. | ................ 396/518 |
| 6,173,120 B1 | * | 1/2001 | Takatori | ...................... 396/36 |
| 6,262,757 B1 | * | 7/2001 | Masubuchi et al. | ......... 347/225 |

* cited by examiner

Primary Examiner—Hai Pham
(74) Attorney, Agent, or Firm—Sughrue Mion, PLLC

(57) ABSTRACT

An optical printer module has a film pack compartment that stores a film pack which stores an instant print film in a frame composed of a main frame, a subframe and a cover. The frame contains a claw mechanism and a spread mechanism that includes a pair of spread rollers. The claw mechanism feeds the instant print film out of the film pack while the instant print film is being exposed, and the spread rollers pinch the exposed instant print film fed out of the film pack by the claw mechanism to develop the exposed instant print film and feed the developed instant print film from the optical printer module. The whole surface of the frame shades the film, except for an opening for the film pack.

17 Claims, 10 Drawing Sheets

F I G. 1 2
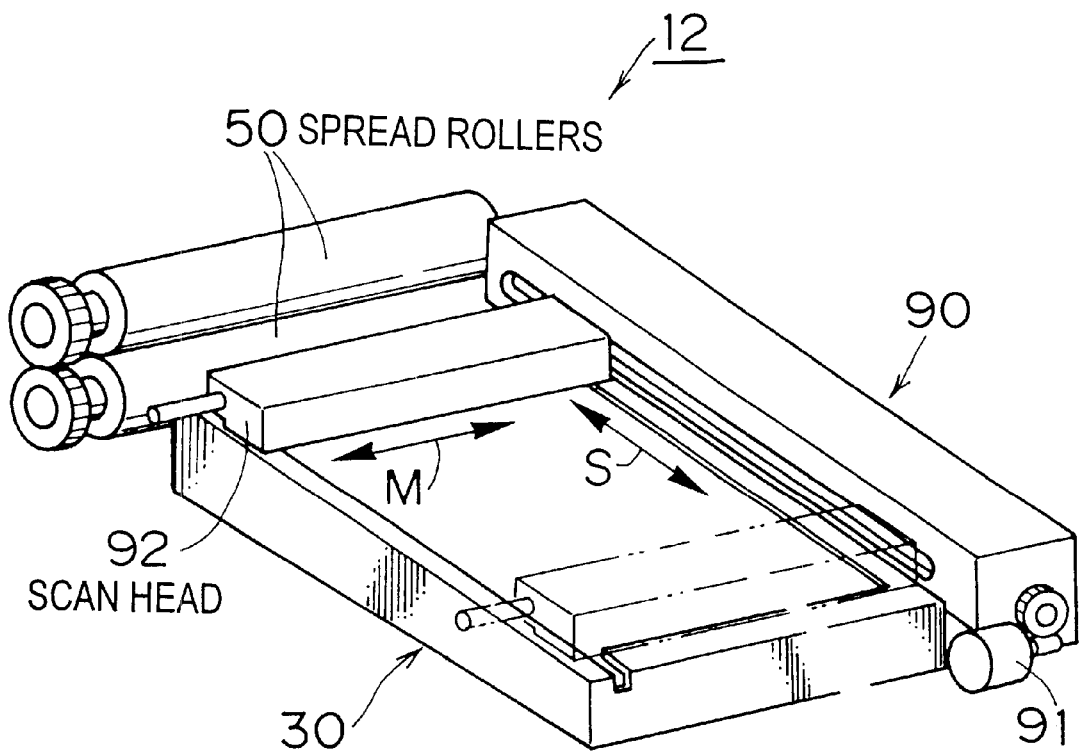

F I G. 1 3
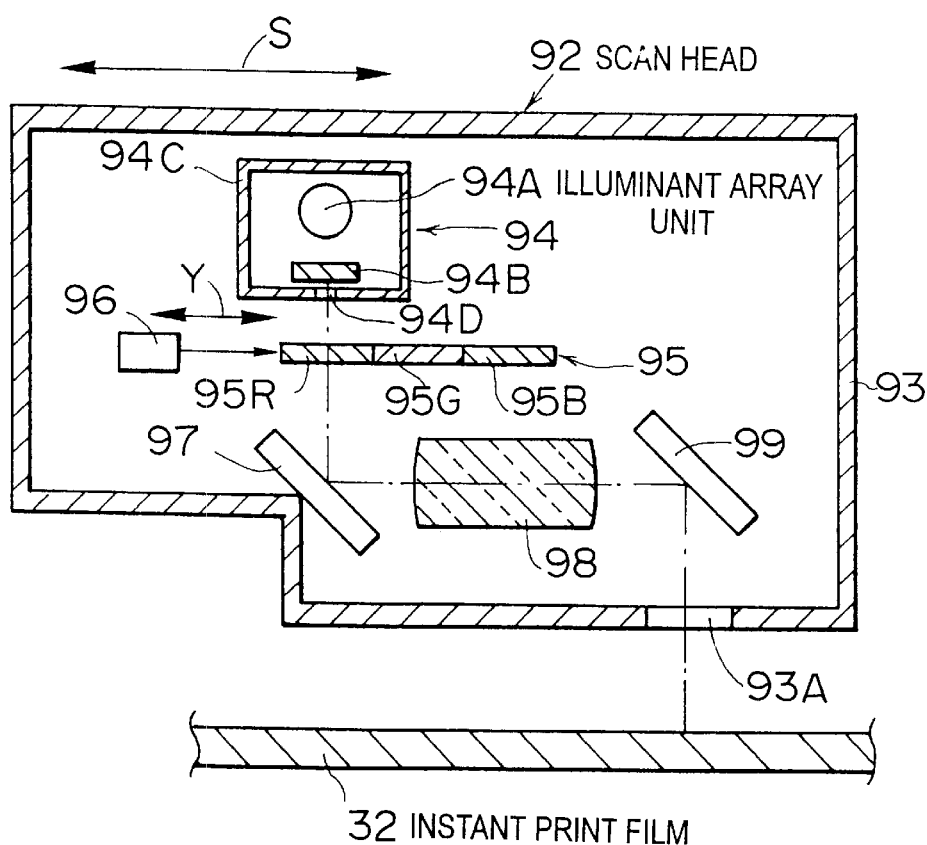

OPTICAL PRINTER MODULE

BACKGROUND OF THE INVENTION

1. Field of the Invention

The present invention generally relates to an optical printer module, and more particularly to an optical printer module that exposes an instant print film with a light-emission head.

2. Description of Related Art

An optical printer that uses a plastic film pack storing instant print films is known.

This type of optical printer controls light emissions of a line-shaped light-emission head according to image signals to expose the film in the front on the color-by-color basis in order to form a color image on the film. Then, the optical printer feeds the exposed film to spread rollers with a claw mechanism. The spread rollers develop the film and feed it out of the optical printer.

The optical printer needs to shade the films from light other than the light of the light-emission head. However, it is difficult to shade the films since the printer has driving mechanisms for the spread rollers and the claw mechanism. In addition, a casing of the printer shades the films, and thus the casing can not be unrestrainedly designed.

A spread mechanism including the spread rollers, the claw mechanism and so on need to be precise and reliable, and the whole printer including the spread mechanism and the claw mechanism is designed for each type of printer even if each type of printer uses the same film pack.

SUMMARY OF THE INVENTION

The present invention has been developed in view of the above-described circumstances, and has as its object the provision of an optical printer module that can be used for different types of optical printers that use the same film pack to lower costs of the optical printers, and in which a casing of an optical printer does not need to shade a film and can be unrestrainedly designed.

To achieve the above-described object, the present invention is directed to an optical printer module, comprising: a film pack compartment that stores a film pack storing an instant print film; a claw mechanism that feeds the instant print film out of the film pack while the instant print film is being exposed; a spread mechanism that includes a pair of spread rollers that pinch the exposed instant print film fed out of the film pack by the claw mechanism to develop the exposed instant print film and feed the developed instant print film from the optical printer module; and a frame whose whole surface shades the film, except for an opening for the film pack, wherein the film pack compartment, the claw mechanism and the spread mechanism are arranged in the frame.

According to the present invention, the optical printer module can be applied to various optical printers (including an optical printer integrated with an electronic camera) in order to lower the costs of the optical printers. Moreover, the casing of the optical printer does not need to shade the films, except for a lid that is opened when the film pack is to be put in and taken from the film pack compartment. Thus, the casing of the optical printer can be unrestrainedly designed, and for example, it may be made from a transparent material. If a light-emission head is improved, only the light-emission head in the optical printer module is replaced.

The optical printer module further comprises the light-emission head that exposes the instant print film in the frame. Thus, the light-emission head can be used for various optical printers.

The optical printer module further comprises a speed determining part that determines a speed of the instant print film fed by the claw mechanism and the spread mechanism in the frame. The speed determining part is used when the light-emission head is driven in synchronization with the feed of the film.

The optical printer module further comprises a position determining part that determines a position of the claw mechanism in the frame.

The frame is composed of a main frame, a subframe arranged on a side of the main frame, and a cover for the main frame and the subframe, and a space enclosed by the side of the main frame and the subframe contains a driving mechanism for the spread rollers and the claw mechanism. This prevents lights from entering the main frame.

The space enclosed by the side of the main frame and the subframe further contains a motor for driving the spread mechanism and the claw mechanism, and a power transmitting mechanism that transmits driving power of the motor to the spread rollers and a claw of the claw mechanism.

Wires of the speed determining part, the position determining part, the light-emission head and the motor extend out of the frame. Only the wires of them extend out of the frame so that the frame shades the film.

A gear for obtaining driving power for the spread mechanism and the claw mechanism from the outside of the frame is arranged at such a position that the gear juts out of the frame. In addition, wires of the speed determining part, the position determining part and the light-emission head extend out of the frame.

The optical printer module further comprises a light-emission head that exposes the instant print film according to image data, a scan mechanism that moves the light-emission head along the instant print film, and a position determining part that determines a position of the light-emission head.

The frame has an adapter for attaching the optical printer module to an apparatus. The adapter makes it possible for the optical printer module to be easily attached to the apparatus.

Moreover, the frame has a lid at the opening for the film pack, and the lid shades the instant print film when it is closed, and the lid is opened when the film pack is to be put in or taken from the film pack compartment. Furthermore, the lid has a pressure part that presses the instant print film stored in the film pack.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 12 is a perspective view of an essential part of an optical printer module of another embodiment; and FIG. 13 is a section of a scan head in FIG. 12.

DETAILED DESCRIPTION OF THE PREFERRED EMBODIMENT

Hereunder the preferred embodiment of the present invention is explained in detail according to the accompanying drawings.

Figure 1:
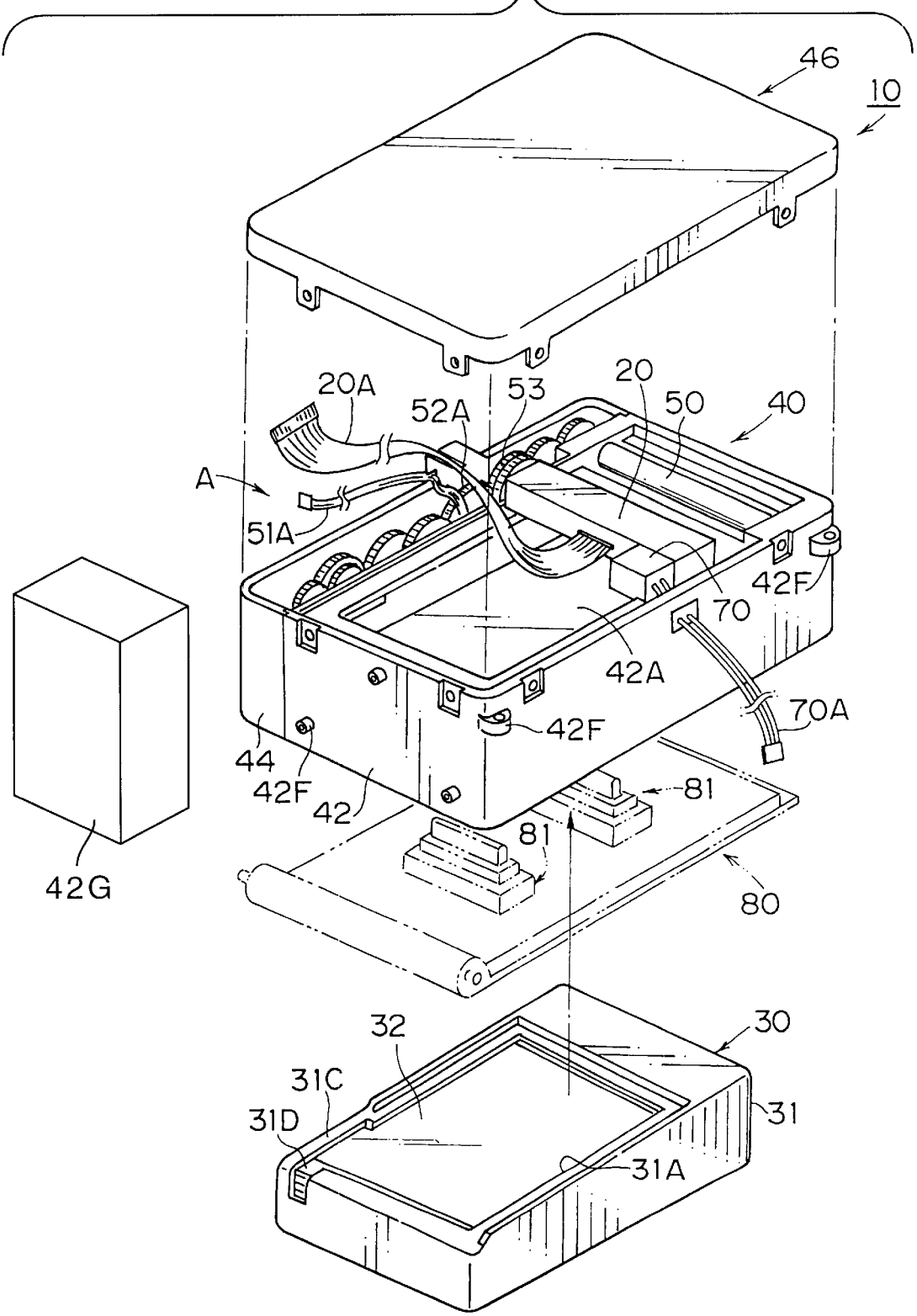
FIG. 1 is a disassembly perspective view showing an embodiment of an optical printer module according to the present invention.
Figure 2:
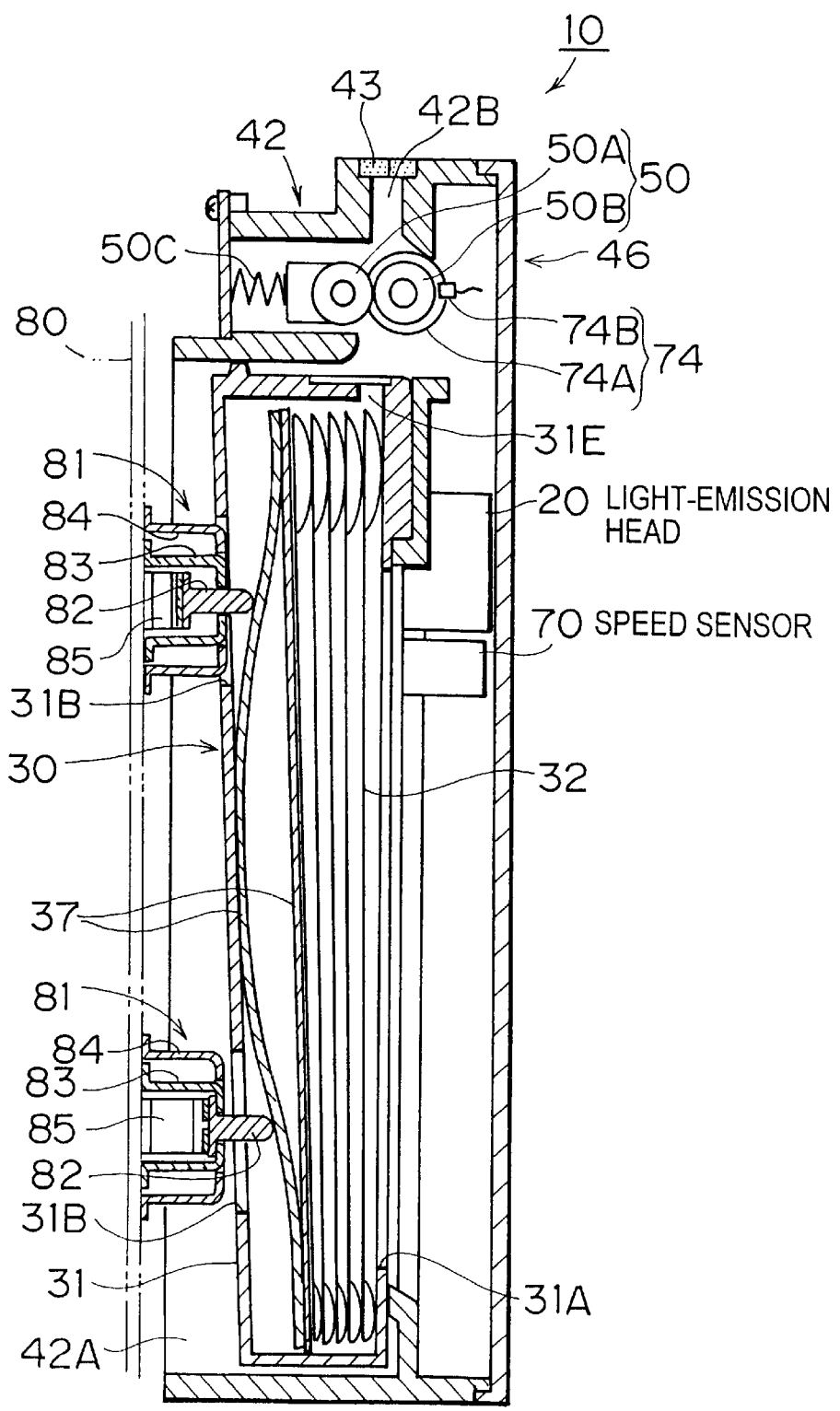
FIG. 2 is a section of the optical printer module in FIG. 1.

FIG. 1 is a disassembly perspective view showing an embodiment of an optical printer module 10, and FIG. 2 is a section of the optical printer module 10.

The optical printer module 10 exposes an instant print film 32 with a light-emission head 20, develops the exposed film 32 by spreading developer in the film 32, and ejects the developed film 32. The optical printer module 10 is composed of a body 40 and a cover 46.

The body 40 has a main frame 42 and a subframe 44, and the main frame 42, the subframe 44 and the cover 46 compose a frame. The frame contains the light-emission head 20, a spread mechanism including a pair of spread rollers 50 (a first spread roller 50A and a second spread roller 50B), and a claw mechanism 60 (see FIG. 4) including a claw 62. The first spread roller 50A is pushed against the second spread roller 50B by a spring. This makes it possible for the spread rollers 50 to press the film 32 appropriately and evenly spread the developer.

The main frame 42 has a film pack compartment 42A that stores a film pack 30 storing the instant print films 32. When the film pack 30 is to be put in the film pack compartment 42A, a lid 80 shown by two-dot chain lines is opened. A space enclosed by the side of the main frame 42 and the subframe 44 contains a driving mechanism for the spread rollers 50 and the claw mechanism 60. A speed sensor 70 that determines the feed speed of the film 32 is provided in the main frame 42. In FIG. 1, the reference numeral 20A denotes a flexible wire for sending control signals and so on to the light-emission head 20, and the reference numeral 51A denotes a wire for driving a motor 51 (see FIGS. 4 and 6), and the reference numeral 70A denotes a wire for reading determination signals from the speed sensor 70, and the reference numerals 42F denote adapters for attaching the optical printer module 10 to an apparatus 42G. In FIG. 2, the reference numeral 42B shows an ejection slot for the instant print films 32, and the reference numeral 43 shows a shade made of a nonwoven fabric or an expandable resin for the ejection slot 42B.

The main frame 42, the subframe 44 and the cover 46 are made from an opaque resin by injection molding, and they are assembled into the printer module 10. Thus, the whole surface of the printer module 10 shades the films 32, except for the opening for the film pack 30.

The lid 80 shown by two-dot chain lines in FIGS. 1 and 2 is provided at the opening for the film pack 30 to shade the films 32. The lid 80 may be included in the printer module 10, and it may not be. This is because the lid 80 can be customized according to the designs, etc. of an optical printer, and it can be fitted to the body when applicable.

The film pack 30 is composed of a plastic casing 31 and the instant print films 32 (for example, 10 sheet films) stored in the casing 31. A pair of pressure parts 81 provided on the inner surface of the lid 80 push the instant print films 32 so that the film in the front is at an exposure opening 31A of the casing 31.

As shown in FIG. 2, the pair of pressure parts 81 is provided on the inner surface of the lid 80 to project toward the film pack 30. The pressure parts 81 are provided so that they are inserted into the film pack 30 through openings 31B of it when the lid 80 is closed. The pressure parts 81 push the instant print films 32 from behind through shade covers 37. This pushes the film in the front against the periphery of the exposure opening 31 A to keep the film flat.

Each pressure part 81 is composed of a projecting block 82, an extending frame 83, a holding frame 84 and a plate spring 85. The base (a flange) of the projecting block 82 is in the extending frame 83, and the projecting block 82 is pushed to the right by the plate spring 85. The base (a flange) of the extending frame 83 is in the holding frame 84.

The holding frame 84 is fixed to the lid 80, and a hole is formed in the right surface of the holding frame 84 to enable the extending frame 83 to extend from it. The flange of the extending frame 83 prevents it from coming out of the holding frame 84 by being in contact with the periphery of the hole. A hole is formed in the right surface of the extending frame 83 to enable the projecting block 82 to project from it. The flange of the projecting block 82 prevents it from coming out of the extending frame 83 by being in contact with the periphery of the hole.

The pressure part 81 increases the total movement amount of the projecting block 82, and it makes the holding frame 84 thin.

Figure 3:
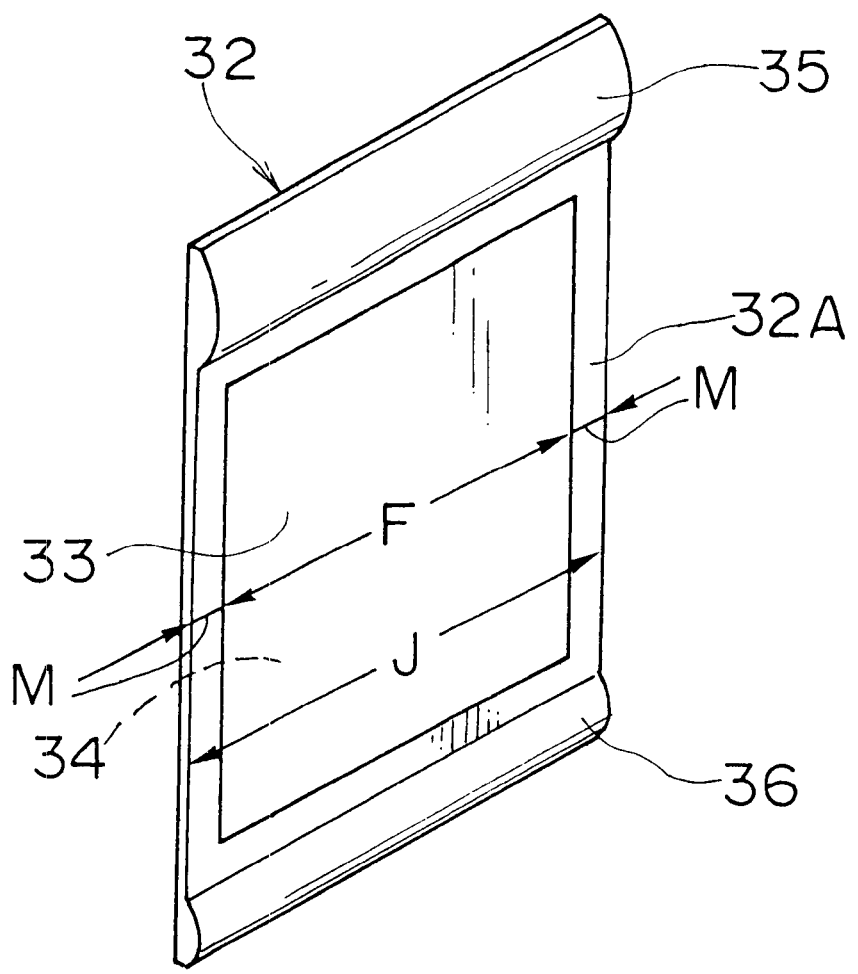
FIG. 3 is a perspective view of an instant print film used by the optical printer module.

As shown in FIG. 3, each instant print film 32 is composed of a photosensitive sheet 33, an image receiving sheet 34 on the other side of the photosensitive sheet 33, a developer pod 35 that contains developer above the photosensitive sheet 33 and the image receiving sheet 34, and a trap 36 that absorbs the remainder of the developer below the photosensitive sheet 33 and the image receiving sheet 34. The photosensitive sheet 33 is exposed to form a latent image photochemically, and then the photosensitive sheet 33 and the image receiving sheet 34 are put together, and they are pressurized while the developer is spread between them to form a positive.

The spread mechanism and the claw mechanism 60 will now be explained.

Figure 4:
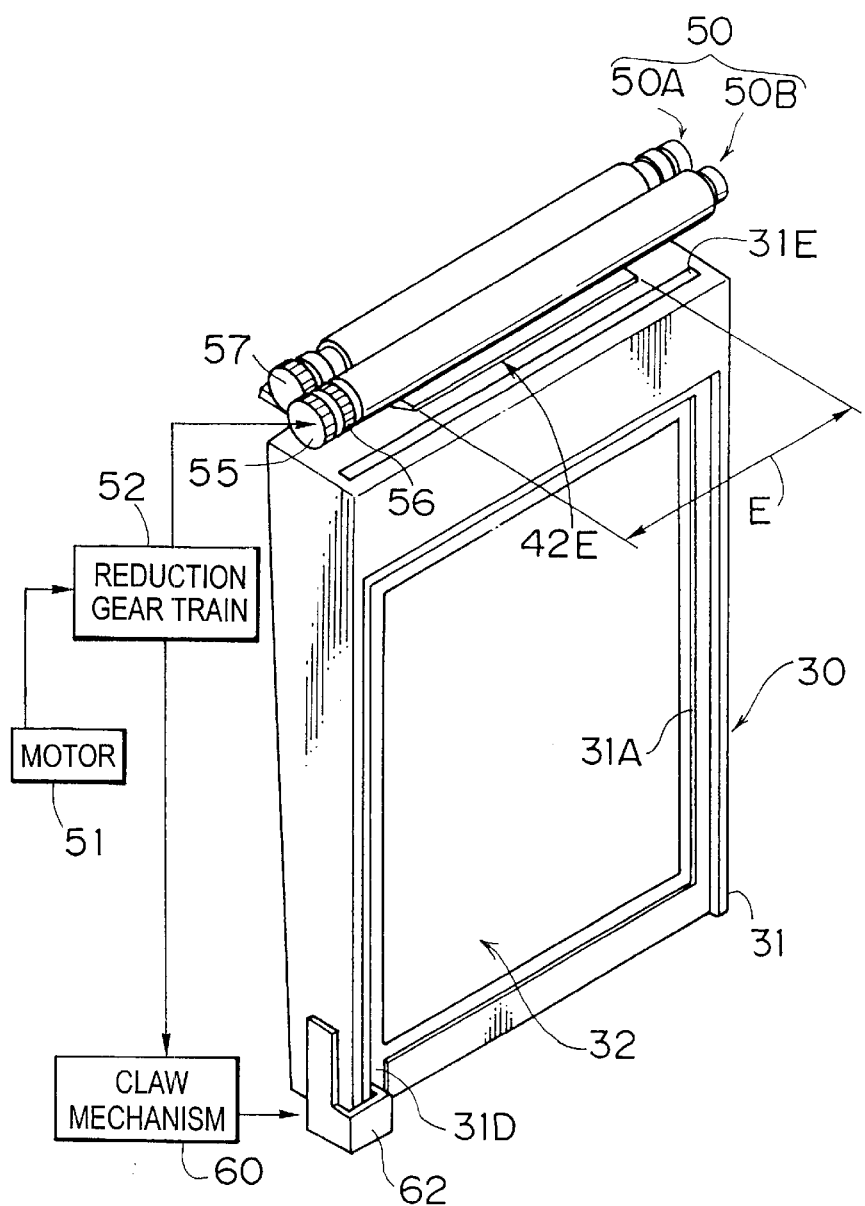
FIG. 4 is an explanatory view showing a spread mechanism and a claw mechanism.

As shown in FIG. 4, driving power is transmitted from the motor 51 to the spread mechanism including the spread rollers 50 and the claw mechanism 60 including the claw 62 through a reduction gear train 52.

Figure 5:
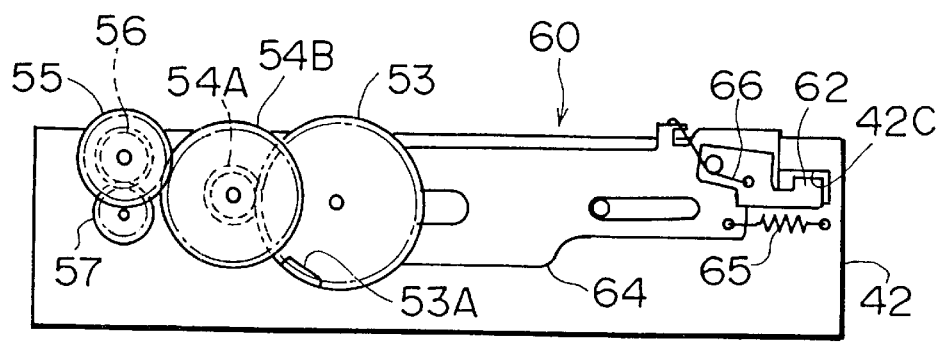
FIG. 5 is a side view showing a body without a subframe seen along an arrow A in FIG. 1.
Figure 6:
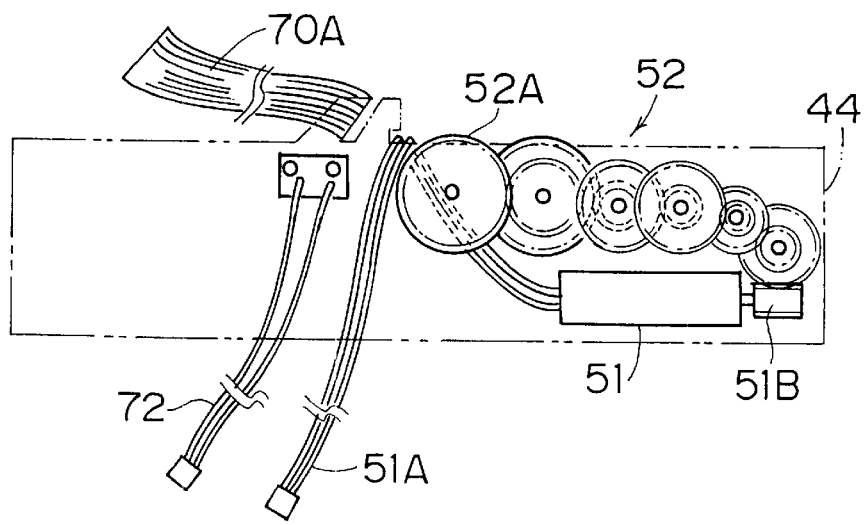
FIG. 6 is a perspective of the subframe with a motor and a reduction gear train.

FIGS. 5 and 6 show a power transmitting mechanism that transmits the driving power from the motor 51 to the spread rollers 50 and the claw 62. FIG. 5 is a side view showing the body 40 without the subframe 44 seen along an arrow A, and FIG. 6 is a perspective of the subframe 44 with the motor 51 and the reduction gear train 52.

As shown in FIG. 6, the motor 51 and the reduction gear train 52 are arranged on the subframe 44, and the driving power of the motor 51 is transmitted from a worm 51B on the output shaft of the motor 51 to the last gear 52A of the reduction gear train 52 through the other gears.

When the subframe 44 is fixed to the main frame 42, the gear 52A on the subframe 44 is engaged with a gear 53 on the main frame 42. The driving power applied to the gear 53 is transmitted to a gear 55 on the shaft of the second spread roller 50B through gears 54A and 54B. Then, the driving power is transmitted to a gear 57 on the shaft of the first spread roller 50A through a gear 56 on the shaft of the second spread roller 50B (see FIG. 4). Thus, the spread rollers 50 rotate in the opposite directions.

As shown in FIG. 5, the claw mechanism 60 is composed of the claw 62, a slider 64, a return spring 65 and a torsion spring 66. The claw 62 is rotatably provided at the end of the slider 64, and pushed clockwise in FIG. 5 by the torsion spring 66. The end of the claw 62 projects into the film pack compartment 42A through an opening 42C formed in the side of the main frame 42. When the film pack 30 is stored in the film pack compartment 42A, the end of the claw 62 comes in contact with a guide surface 31C (see FIG. 1) formed on the casing 31 by being pushed by the torsion spring 66, and it is inserted into a cutout 31D formed in the casing 31 so that it can come in contact with only the film 32 in the front.

The slider 64 is arranged on the side of the main frame 42 so that it moves horizontally in FIG. 5. A coupler that couples with a cam (not shown) provided on the back of the gear 53 is provided on the left end of the slider 64, and one end of the return spring 65 is connected to the right end of the slider 64. When the gear 53 rotates once, the slider 64 reciprocates. This put the end of the claw 62 into contact with the bottom of the film 32 in the front, and sends the film 32 out of the casing 31 through an exit 31E until it is pinched by the spread rollers 50.

A swell 53A is formed on the gear 53, and a position sensor (not shown) that is turned on and off by the swell 53A is attached to the subframe 44 to determine the position of the claw mechanism 60. The reference numeral 72 denotes a wire for reading determination signals from the position sensor, and the motor 51 is controlled according to the position of the claw mechanism 60.

The light-emission head 20 will now be explained.

Figure 7:
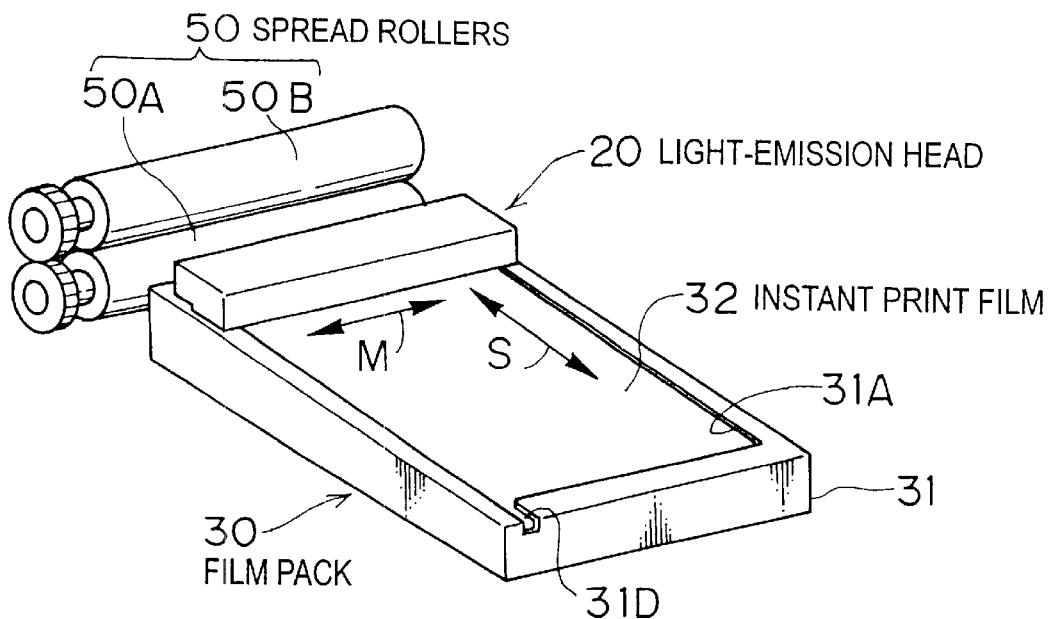
FIG. 7 is an explanatory diagram showing the relation between the light-emission head and a film pack in the optical printer module.

As shown in FIG. 7, the light-emission head 20 is fixed at the top of the exposure opening 31A of the film pack 30, and a main scanning direction M of the light-emission head 20 is perpendicular to the feeding direction of the film 32 (a subscanning direction S) (see FIGS. 1 and 2).

Figure 8:
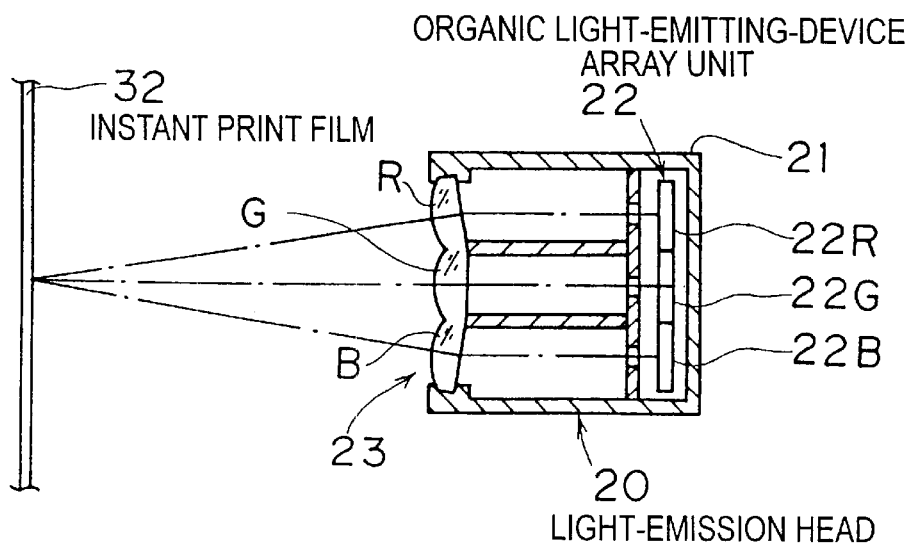
FIG. 8 is a section of the light-emission head.

FIG. 8 is a section of the light-emission head 20. The light-emission head 20 has an organic light-emitting-device array unit 22 and a microlens array (a SELFOC lens group, a microlens group, or the like) 23.

The organic light-emitting-device array unit 22 is composed of organic light-emitting-device arrays 22R, 22G and 22B. The peak wavelength of the emission spectrum of the organic light-emitting-device array 22R is 600–740 nm (red), and the peak wavelength of the emission spectrum of the organic light-emitting-device array 22G is 500–600 nm (green), and the peak wavelength of the emission spectrum of the organic light-emitting-device array 22B is 380–500 nm (blue). Each of the organic light-emitting-device arrays 22R, 22G and 22B has multiple light-emitting devices corresponding to the horizontal pixels of the film 32 (the main scanning direction), and they are vertically arranged along the feeding direction of the film 32 (the subscanning direction). The brightness and time of the light emission by each light-emitting device are controlled according to the corresponding pixel.

The microlens array 23 prevents the lights from spreading to other pixels, and it is composed of SELFOC lenses 23R, 23G and 23B. The top and bottom SELFOC lenses 23R and 23B are inclined with respect to the middle SELFOC lens 23G so that the lights focus on one line of the pixels of the film 32.

In case directivity of the lights is high, the microlens array 23 may be omitted. In addition, band-pass filters may be provided between the organic light-emitting-device array unit 22 and the microlens array 23. The band-pass filters decrease the full width at half maximum of the emission spectrums, and reduce spectral color-mixing at the exposure to raise color reproduction.

The light-emission head 20 exposes the film 32 on the line-by-line basis with the main scanning while the film 32 is fed (subscanning) by the claw mechanism 60 and the spread rollers 50. Though the light-emission head 20 needs to perform the main scanning on the line-by-line basis in synchronization with the feed of the film 32, the feeding speed of the film 32 is changed by various causes.

For example, when the film 32 passes a shade flap 31F (see FIG. 10) provided at the exit 31E of the film pack 30, when the spread rollers 50 take over the feeding of the film 32 from the claw mechanism 60, when the developer pod 35 is burst, and when the battery is exhausted, the feeding speed of the film 32 is changed. The speed sensor 70 is provided as shown in FIGS. 1 and 2 to eliminate the unevenness of depth due to the change of the feeding speed.

The speed sensor 70 optically or magnetically reads a speed determination track on the film that has black and white bars or N and S poles with regular intervals, or determines the rotation speed of a roller that rotates by being in contact with the film.

Another speed sensor may be an encoder 74 in FIG. 2 composed of an encoding plate 74A provided on the second spread roller 50B and a sensor 74B that determines the rotation speed of the encoding plate 74A (the second spread roller 50B). The rotation speed of the second spread roller 50B is in proportion to the feed speed of the film 32 when the spread rollers 50 feed the film 32.

In case the encoder 74 is used as the speed sensor, it can not determine the feed speed of the film 32 until the spread rollers 50 pinch the film 32. In this case, the speed sensor 70 or a sensor that determines the speed of the slider 64 or the like is used.

Figure 9:
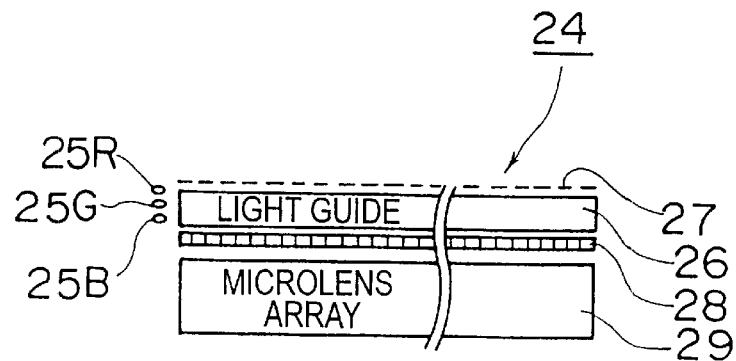
FIG. 9 is a section of another light-emission head that may be used in the optical printer module.

FIG. 9 shows another light-emission head 24.

The light-emission head 24 is mainly composed of light-emitting diodes 25R, 25G and 25B, a light guide 26, a reflector 27, a liquid crystal shutter 28 and a microlens array 29.

The light-emitting diodes 25R, 25G and 25B emit lights in turn when one line of the pixels of the film is exposed. The R, G and B lights emitted from the light-emitting diodes 25R, 25G and 25B are guided to the light guide 26 extending along the main scanning direction, and then reflected to the liquid crystal shutter 28 by the reflector 27.

The liquid crystal shutter 28 has liquid crystal segments corresponding to the pixels, and transmittance of each liquid crystal segment is controlled three times according to the R, G and B image data for one line. The transmitted lights that have passed the liquid crystal shutter 28 are guided to the film through the microlens array 29 to form an image on the film.

The spread mechanism for the film 32 will now be explained with reference to FIGS. 10 and 11.

Figure 10:
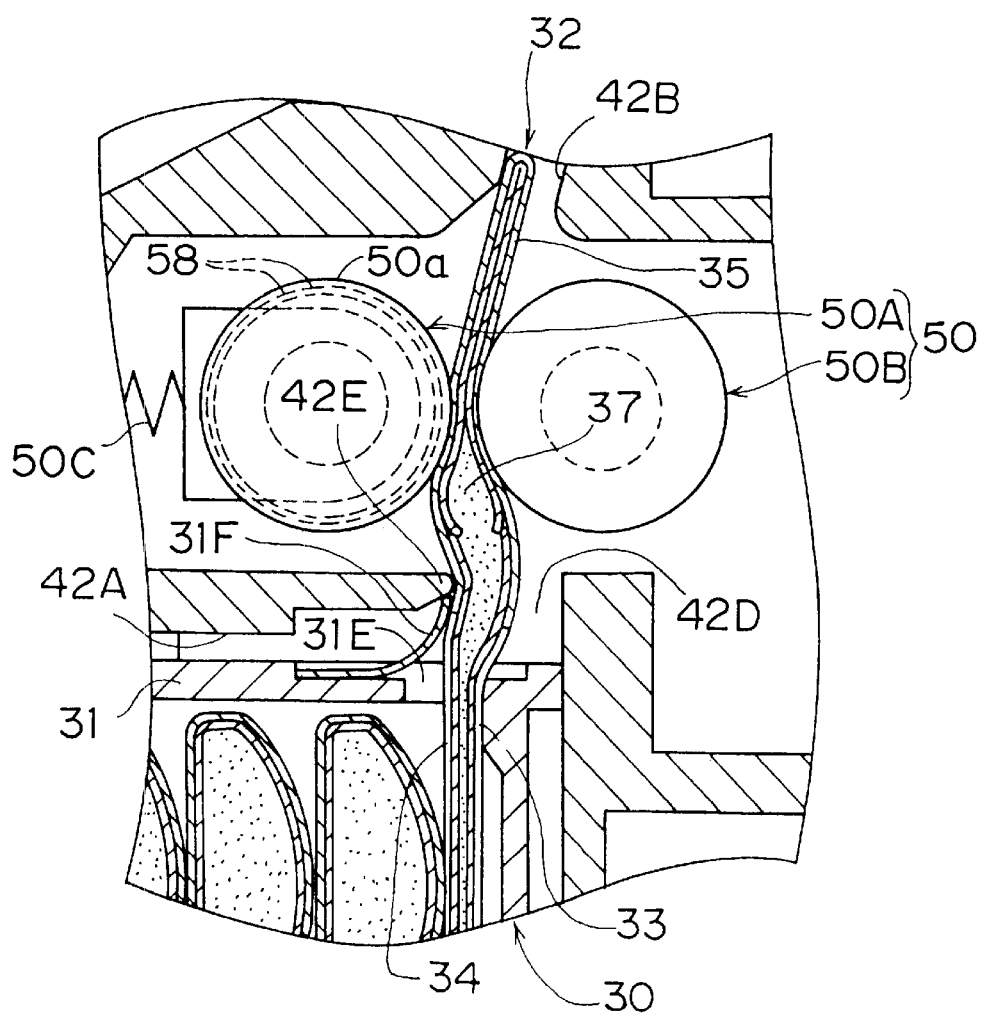
FIG. 10 is a section of an essential part of the spread mechanism of the optical printer module.

As shown in FIG. 10, a slit 42D is formed in the top of the film pack compartment 42A, and the exposed film 32 is sent out of the film pack compartment 42A through the slit 42D. The slit 42D is on the right (in FIG. 10) of the exit 31E of the film pack 30. A spread controller 42E is formed on one side of the slit 42D, and it comes in contact with the image-receiving sheet 34 of the film 32 to control the spread of the developer 37 that flows from the developer pod 35 to between the photosensitive sheet 33 and the image-receiving sheet 34.

The tip of the spread controller 42E is round so as not to damage the image-receiving sheet 34. The bottom of the spread controller 42E is tapered to guide the film 32 from the exit 31E of the film pack 30 to the slit 42D.

The width E of the spread controller 42E (see FIG. 4) is smaller than the width F of the image-forming surfaces of the photosensitive sheet 33 and the image-receiving sheet 34 (see FIG. 3), and thus the spread controller 42E can spread the developer without coming in contact with a frame sheet 32A.

The first spread roller 50A is pushed against the second spread roller 50B by the spring 50C. Thus, the spread rollers 50 can appropriately press the film 32 and evenly spread the developer.

The second spread roller 50B does not move to stabilize the effect of the spread controller 42E. The contact state (contact position, pressure and so on) between the film 32 and the spread controller 42E and the bend state of the film 32 between the exit 31E and the spread rollers 50 are kept constant.

Figure 11:
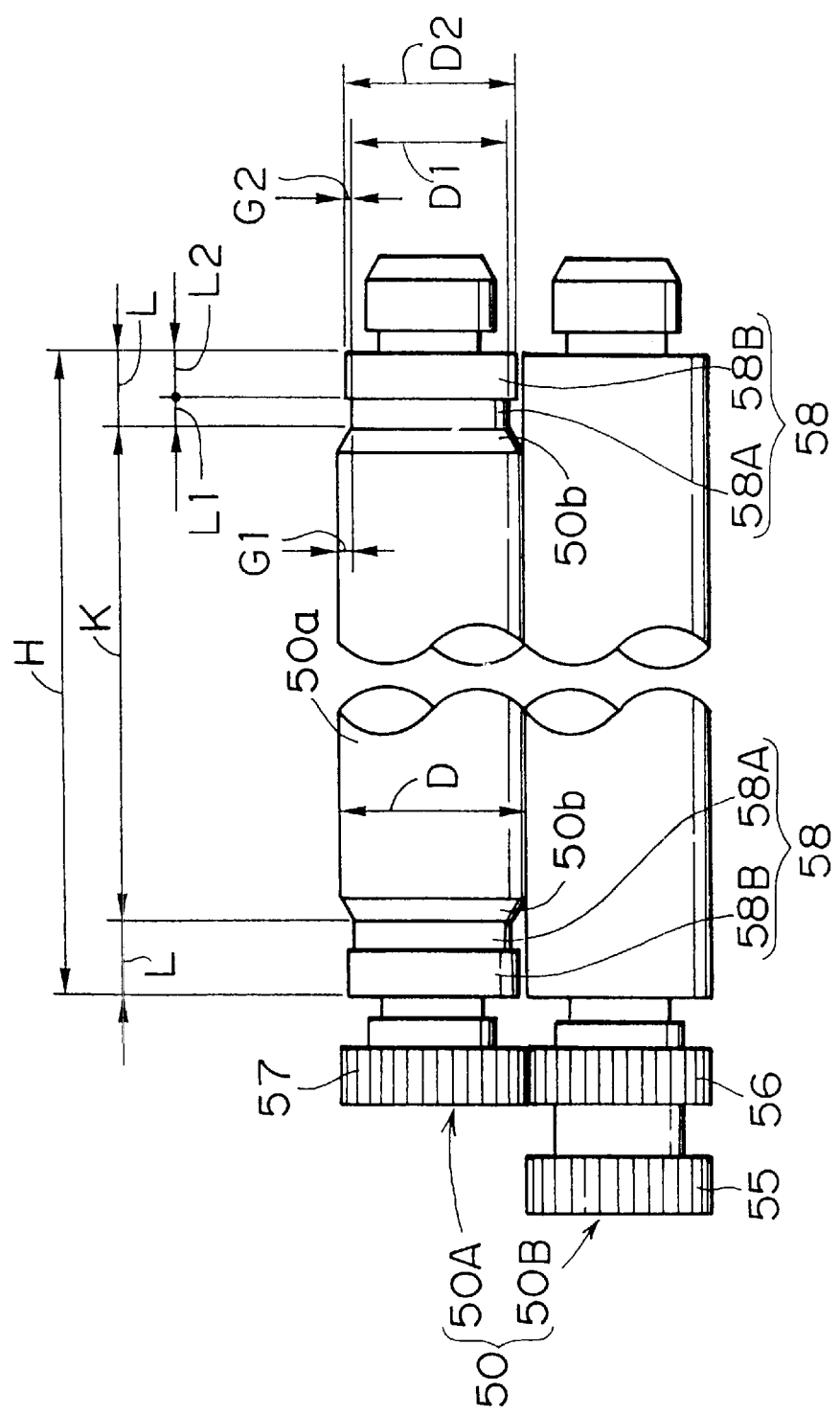
FIG. 11 is a plan of spread rollers of the optical printer module.

As shown in FIG. 11, the first spread roller 50A is composed of a spread part 50a formed in the middle of the first spread roller 50A to press the image-forming surface of the film 32 and thin parts 58 formed at both ends of the spread part 50a. The thin parts 58 are thinner than the spread part 50a, and each thin part 58 is composed of a first thin part 58A on the middle side and a second thin part 58B on the end side.

A diameter D of the spread part 50a is larger than a diameter D2 of the second thin part 58B, and the diameter D2 of the second thin part 58B is larger than a diameter D1 of the first thin part 58A. Half of the difference G1 between the diameters D and D1 is equal to the thickness of the frame sheet 32A of the film 32, and half of the difference G2 between the diameters D2 and D1 is equal to the appropriate thickness of the spread developer.

A length H of the first spread roller 50A and the second spread roller 50B is substantially equal to a width J of the film 32 (see FIG. 3), and the width K of the spread part 50a is slightly smaller than the width F of the image-forming surfaces of the photosensitive sheet 33 and the image-receiving sheet 34. A total length L of the length L1 of the first thin part 58A and the length L2 of the second thin part 58B is equal to a width M of the frame sheet 32A. Inclined parts 50b are formed between the spread part 50a and the first thin parts 58A.

The sides of the frame (the frame sheet 32A) of the film 32 are pinched by the second thin part 58B and the second spread roller 50B. This makes the gap between the spread part 50a of the first spread roller 50A and the second spread roller 50B appropriate for the spread of the developer when the film 32 is pinched. In addition, the spread part 50a comes in contact with the image-forming surface without coming into contact with the frame sheet 32A, and this improves the spread effect of the developer.

Also, gaps of the thickness of the frame sheet 32A are formed between the first thin parts 58A and the second spread roller 50B when the film 32 is pinched since the first thin parts 58A is thinner than the second thin parts 58B. The developer flows into the gaps to firmly come to the edges of the image-forming surface, and this keeps the quality of the entire print appropriate.

In addition, since the inclined parts 50b are formed between the spread part 50a and the first thin parts 58A, the image-receiving sheet 34 and an image-receiving layer of the film 32 are smoothly bent. This prevents splits and the like of the image-receiving sheet 34 due to stress concentration, and spreads the developer to the edges of the image-forming surface.

The tip of the spread controller 42E is substantially right below the contact position of the spread rollers 50A and 50B. The film 32 comes in contact with the spread rollers 50, the spread controller 42E and the side of the exit 31E, and the film 32 is gently bent in the S-shape. Because of the bend of the film 32 and the stabilization of the contact of the film 32 and the spread controller 42E, the thickness of the spread developer becomes even and constant.

In the optical printer module 10 of the embodiment, the light-emission head is fixed, and the film is exposed on the line-by-line basis while being fed. However, the light-emission head may be moved along the subscanning direction to expose the film on the color-by-color basis.

FIG. 12 shows an essential part of an optical printer module 12 that exposes the film on the color-by-color basis. The same members as those in the optical printer module 10 in FIG. 1 are denoted by the same reference numerals, and they will not be explained again.

The optical printer module 12 has a head driving mechanism 90 and a scan head 92 instead of the light-emission head 20. The main scanning direction M of the scan head 92 is perpendicular to the feeding direction of the film 32 (the subscanning direction S), and the length of the scan head 92 is larger than the width of the film 32. The head driving mechanism 90 moves the scan head 92 along the subscanning direction S with a scan motor 91. Guide pins are provided on both sides of the scan head 92 and coupled with guide grooves so that the scan head 92 does not become oblique.

FIG. 13 is a section of the scan head 92. The scan head 92 has an illuminant array unit 94 perpendicularly to the subscanning direction S, and the illuminant array unit 94 is composed of a fluorescent lamp 94A, a liquid crystal shutter 94B and a shade casing 94C.

The liquid crystal shutter 94B is at the inside of an opening 94D of the shade casing 94C, and it has a line of liquid crystal segments. Each liquid crystal segment corresponds to one pixel of the film 32, and depth and the amount of a transmitted light of each liquid crystal segment are controlled.

Color filters 95 are provided outside the illuminant array unit 94, and they are filters 95R, 95G and 95B for R, G and B exposures, respectively. A filter shifting part 96 moves the color filters 95 along an arrow Y so that one of the filters 95R, 95G and 95B is on the optical path.

R, G or B print lights that have passed the filter 95R, 95G or 95B are guided to a mirror 97, a SELFOC lens array 98 and a mirror 99, and they come out of the scan head 92 through an opening 93A to arrive at the film 32.

The optical printer module 12 needs a sensor that determines the position and the speed in the subscanning direction of the scan head 92. In addition, the optical printer module has the light-emission head in the embodiment, but the optical printer module of the present invention does not necessarily include the light-emission head so that the design, etc. of the light-emission head can be changed. Moreover, the motor for driving the spread mechanism and the claw mechanism is provided in the optical printer module in the embodiment, but a gear for gaining the driving power from the outside of the optical printer module may be provided at such a position that it juts out of the frame.

As explained above, the optical printer module according to the present invention has the spread mechanism, the claw mechanism and the film pack compartment in the frame, and the whole surface of the frame shades the films, except for the opening for the film pack. Thus, the optical printer module can be applied to any optical printers (including an optical printer integrated with an electronic camera) that use the same film pack in order to lower the costs of the optical printers. Moreover, the casing of the optical printer does not need to shade the films, except for the lid that is opened when the film pack is to be put in and taken from the film pack compartment. Thus, the casing of the optical printer can be unrestrainedly designed, and for example, it may be made from a transparent material.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An optical printer module, comprising:
   a film pack compartment that stores a film pack storing an instant print film;
   a claw mechanism that feeds the instant print film out of the film pack while the instant print film is being exposed;
   a spread mechanism that includes a pair of spread rollers that pinch the exposed instant print film fed out of the film pack by the claw mechanism to develop the exposed instant print film and feed the developed instant print film from the optical printer module; and
   a frame whose whole surface shades the film, except for an opening for the film pack,
   wherein the film pack compartment, the claw mechanism and the spread mechanism are arranged in the frame, and
   wherein the frame has an adapter for attaching the optical printer module to an apparatus.

2. The optical printer module as set forth in claim 1, further comprising a light-emission head that exposes the instant print film in the frame.

3. The optical printer module as set forth in claim 1, further comprising a speed determining part that determines a speed of the instant print film fed by the claw mechanism and the spread mechanism in the frame.

4. The optical printer module as set forth in claim 1, further comprising a position determining part that determines a position of the claw mechanism in the frame.

5. The optical printer module as set forth in claim 1, wherein:
   the frame is composed of a main frame, a subframe arranged on a side of the main frame, and a cover for the main frame and the subframe; and
   a space enclosed by the side of the main frame and the subframe contains a driving mechanism for the spread rollers and the claw mechanism.

6. The optical printer module as set forth in claim 5, wherein the space enclosed by the side of the main frame and the subframe further contains a motor for driving the spread mechanism and the claw mechanism, and a power transmitting mechanism that transmits driving power of the motor to the spread rollers and a claw of the claw mechanism.

7. The optical printer module as set forth in claim 6, wherein wires of the speed determining part, the position determining part, the light-emission head and the motor extend out of the frame.

8. The optical printer module as set forth in claim 1, wherein a gear for obtaining driving power for the spread mechanism and the claw mechanism from the outside of the frame is arranged at such a position that the gear juts out of the frame.

9. The optical printer module as set forth in claim 8, wherein wires of the speed determining part, the position determining part and the light-emission head extend out of the frame.

10. The optical printer module as set forth in claim 1, further comprising:
    a light-emission head that exposes the instant print film according to image data;
    a scan mechanism that moves the light-emission head along the instant print film; and
    a position determining part that determines a position of the light-emission head.

11. The optical printer module as set forth in claim 1, wherein:
    the frame has a lid at the opening for the film pack;
    the lid shades the instant print film when it is closed; and
    the lid is opened when the film pack is to be put in or taken from the film pack compartment.

12. The optical printer module as set forth in claim 11, wherein the lid has a pressure part that presses the instant print film stored in the film pack.

13. An optical printer module, comprising:
    a film pack compartment that stores a film pack storing an instant print film;
    a claw mechanism that feeds the instant print film out of the film pack while the instant print film is being exposed;
    a spread mechanism that includes a pair of spread rollers that pinch the exposed instant print film fed out of the film pack by the claw mechanism to develop the exposed instant print film and feed the developed instant print film from the optical printer module;
    a light-emission head that exposes the instant print film;
    a speed determining part that determines a speed of the instant print film fed by the claw mechanism and the spread mechanism in the frame;
    a position determining part that determines a position of the claw mechanism;
    a motor that drives the claw mechanism and the spread mechanism;
    a power transmitting mechanism that transmits driving power of the motor to the spread rollers and a claw of the claw mechanism;
    a frame whose whole surface shades the film, except for an opening for the film pack, the frame enclosing the film pack compartment, the claw mechanism, the spread mechanism, the light-emission head, the speed determining part, the position determining part, the motor, and the power transmitting mechanism; and a connector including a wire that electrically connects the light-emission head to an external apparatus in order to send control signals to the light emission head, a wire that electrically connects the speed determining part to the external apparatus in order to read determination signals from the speed determining part, a wire that electrically connects the position determining part to the external apparatus in order to read determination signals from the position determining part, and a wire that electrically connects the motor to the external apparatus in order to drive the motor, the connector being arranged on the frame.

14. The optical printer module as set forth in claim 13, wherein:

the frame is composed of a main frame, a subframe arranged on a side of the main frame, and a cover for the main frame and the subframe; and a space enclosed by the side of the main frame and the subframe contains a driving mechanism for the spread rollers and the claw mechanism.

15. The optical printer module as set forth in claim 13, wherein a gear for obtaining driving power for the spread mechanism and the claw mechanism from the outside of the frame is arranged at such a position that the gear juts out of the frame.

16. An optical printer module, comprising:

a film pack compartment that stores a film pack storing an instant print film;

a claw mechanism that feeds the instant print film out of the film pack while the instant print film is being exposed;

a spread mechanism that includes a pair of spread rollers that pinch the exposed instant print film fed out of the film pack by the claw mechanism to develop the exposed instant print film and feed the developed instant print film from the optical printer module;

a frame whose whole surface shades the film, except for an opening for the film pack, the frame enclosing the film pack compartment, the claw mechanism, and the spread mechanism; and a connecting part that mechanically receives driving power for the spread mechanism and the claw mechanism from an external apparatus.

17. The optical printer module as set forth in claim 16, wherein:

the frame is composed of a main frame, a subframe arranged on a side of the main frame, and a cover for the main frame and the subframe; and a space enclosed by the side of the main frame and the subframe contains a driving mechanism for the spread rollers and the claw mechanism.

\* \* \* \* \*